US007184056B2

(12) United States Patent
Brody et al.

(10) Patent No.: US 7,184,056 B2
(45) Date of Patent: Feb. 27, 2007

(54) METHOD AND APPARATUS FOR USER CUSTOMIZED SHADING OF A GRAPHICAL USER INTERFACE

(75) Inventors: Sarah Brody, San Jose, CA (US); Tim Wasko, High River (CA); Robert Kondrk, Mountain View, CA (US)

(73) Assignee: Apple Computer, Inc., Cupertino, CA (US)

( * ) Notice: Subject to any disclaimer, the term of this patent is extended or adjusted under 35 U.S.C. 154(b) by 45 days.

(21) Appl. No.: 10/301,500

(22) Filed: Nov. 20, 2002

(65) Prior Publication Data

US 2004/0104911 A1    Jun. 3, 2004

(51) Int. Cl.
G09G 5/02    (2006.01)
(52) U.S. Cl. .................. 345/594; 345/601; 345/606; 382/274; 715/744; 715/765; 715/833; 715/866
(58) Field of Classification Search ................ 345/833, 345/589, 592, 601, 606, 594; 715/744, 765; 715/833, 866
See application file for complete search history.

(56) References Cited

U.S. PATENT DOCUMENTS

| 5,721,851 | A | 2/1998 | Cline et al. |
| 6,177,945 | B1 | 1/2001 | Pleyer |
| 6,191,790 | B1 * | 2/2001 | Bogdan ...................... 345/426 |
| 6,850,259 | B1 * | 2/2005 | Rzepkowski et al. ....... 715/835 |

| 2003/0021488 | A1 * | 1/2003 | Shaw et al. ................. 382/260 |
| 2003/0142140 | A1 * | 7/2003 | Brown et al. ............... 345/803 |

FOREIGN PATENT DOCUMENTS

| EP | 0757309 A | 2/1997 |
| JP | 9044335 A | 2/1997 |

OTHER PUBLICATIONS

Screenshots #1-13 of Microsoft Windows NT 4.0. Microsoft Corporation, Copyright 1981-1998. Released, Aug. 1996. Screenshots created Oct. 13, 2004.*

* cited by examiner

Primary Examiner—Kee M. Tung
Assistant Examiner—Antonio Caschera
(74) Attorney, Agent, or Firm—Stattler Johansen & Adeli LLP (57) ABSTRACT

To allow users to compensate for different and dynamically changing lighting conditions, the present invention introduces a graphical user interface shading system. The graphical user interface shading system provides a very simple intuitive interface to the user. In one embodiment, the user is presented with an adjustable user interface widget such as a slider that allows the user to select any shading setting along a shading continuum. The graphical user interface shading system reacts to the users control by adjusting a number of different graphical user interface elements in response to the new shading setting. In one embodiment, the graphical user interface shading system adjusts singled colored areas with a linear interpolation, text with a font color selection, icons with an icon bitmap selection, textured areas with a texture blend, and decals with a decal blend.

14 Claims, 7 Drawing Sheets

METHOD AND APPARATUS FOR USER CUSTOMIZED SHADING OF A GRAPHICAL USER INTERFACE

FIELD OF THE INVENTION

The present invention relates to the field of human to computer interface systems. In particular the present invention discloses highly customizable graphical user interface shading system.

BACKGROUND OF THE INVENTION

Since the 1980's graphical user interfaces have become the primary interface between users and computer systems. Graphical user interfaces present information to computer users in a simple and intuitive manner. For example, most current word processors employ a main window with What-You-See-Is-What-You-Get (WYSIWYG) display of the document and a set of graphical tool icons displayed on a tool bar for editing the document.

Many users wish to alter a graphical user interface to adapt the graphical user interface to their particular personal preferences. To implement such personalization, many graphical user interface systems allow a user to select color schemes, alter the appearance of the graphical user interface icons, modify the contents of the pull-down menus, and adjust the tools that available on a particular toolbar.

Although some graphical user interface systems allow users to customize some aspects of the graphical user interface, the amount of customization allowed is limited and the customization that is available is not very intuitive. In fact, some operating systems provide such limited customization that is difficult to use that a user is forced to purchase an add-on extra product if better customization is desired. Even with the add-on pack, the user is forced to select from a set of pre-defined graphical user interface settings. Thus, it would be desirable to provide users with a more flexible and easier to use graphical user interface customization tool.

SUMMARY OF THE INVENTION

To allow users to compensate for different and dynamically changing lighting conditions, the present invention introduces a graphical user interface shading system. The graphical user interface shading system provides a very simple intuitive interface to the user. In one embodiment, the user is presented with an adjustable user interface widget such as a slider that allows the user to select any shading setting along a shading continuum. The graphical user interface shading system reacts to the users control by adjusting a number of different graphical user interface elements in response to the new shading setting. In one embodiment, the graphical user interface shading system adjusts singled colored areas with a linear interpolation between two colors provided. Text areas are handled by selecting a font color dependent on the shading setting. Icons are handled by selecting a particular icon bitmap dependent on the shading setting. The shading system handles textured areas by creating a weighted texture blend between two textures using the shading setting to select the weighting. Finally, decals in the user interface are handled by creating a blend between two decals.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

A method and apparatus for a user customized graphical user interface shading is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the Macintosh Operating Systems (MacOS). However, the techniques and teachings of the present invention can easily be applied to other operating systems or any system that presents a graphical user interface.

Graphical User Interfaces in Various Environments

Computer systems are being used in just about every area of modern life these days. Thus, computers are now used in many different environments: offices, darkened studios, retail stores, malls, airports, stadiums, subways, cars, and even outdoors. All of these different environments present very different lighting conditions. Offices may have fluorescent lighting, darkened studios may have low lighting, and outdoor settings may have strong sunlight.

Beyond the very different possible lighting conditions for computer operation, the lighting conditions at any particular location may vary over time. For example, as the sun moves across the sky, the lighting in a room with a window will vary significantly. Furthermore, clouds may move in and obscure the sun, the sun will eventually set at night, and doors and windows may be opened or closed thus allowing or blocking sunlight, respectively.

With such varied lighting conditions and dynamically changing light conditions, it would be desirable to provide users with a simple and effective manner of adjusting the display of a graphical user interface to best adapt to the current lighting conditions. To provide such functionality, the present invention introduces an intuitive adjustable graphical user interface shading system. The adjustable graphical user interface shading system allows a user to adjust the shading of the graphical user interface along a continuum to select a personal preference.

Graphical User Interface Shading System Overview

To allow users to compensate for different lighting conditions, some graphical user interface systems allow the user to change the colors used to render the graphical user interface. However, such simple customization systems fall short of providing a satisfactory means to allow a user to adjust the graphical user interface in response to different lighting conditions.

The present invention introduces a sophisticated graphical user interface shading system that provides a very simple intuitive interface to the user. In the system of the present invention, the user is presented with an adjustable user interface widget that allows the user to select any location along a shading continuum. In one embodiment, the shading continuum varies from a very dark background with light colored text and icons to a very light background with dark colored text and icons.

In one embodiment the graphical user interface shading system of the present invention, the adjustable user interface widget is a slider bar that allows the user to slide an indicator along a defined range. However, other adjustable user interface widgets may also be employed. For example, the radio-dial knob, a digital display with up and down adjustment buttons, or any other adjustable user interface widget that allows a user to select a value within a define range may be used.

Graphical User Interface Shading System Details

To describe the graphical user interface shading system of the present invention, one particular implementation will be described with reference to FIGS. 1A to 3. However, it should be noted that specific implementation details selected in the disclosed implementation are not required to practice the teachings of the present invention.

Figure 1A:
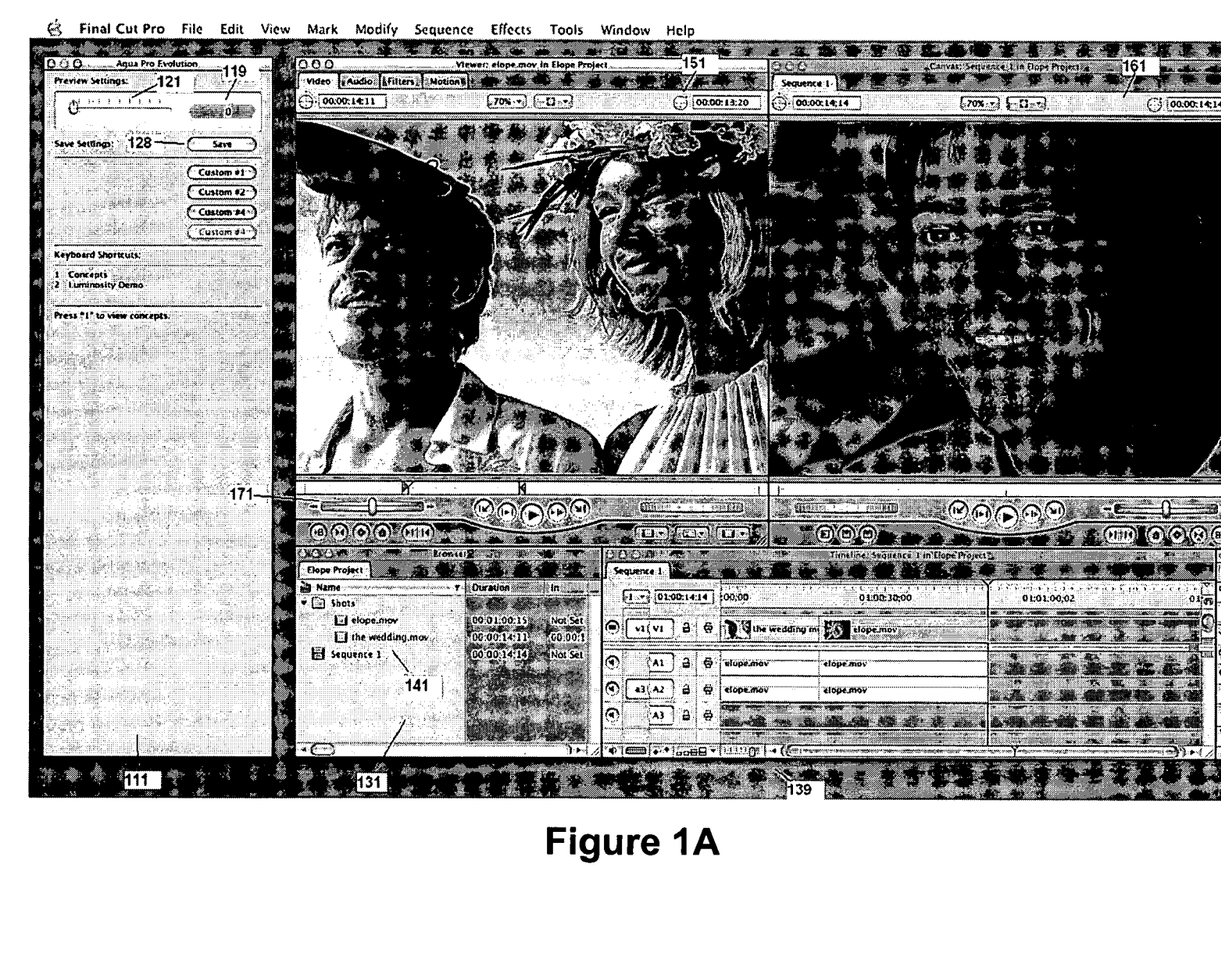
FIG. 1A illustrates a first view of a user interface adjustment window for adjusting the shading of a graphical user interface and a graphical user interface that is having its shading adjusted.

FIG. 1A illustrates an example embodiment of a graphical user interface employing the graphical user interface shading system of the present invention. The left side of FIG. 1A illustrates a user interface adjustment window 111 that contains a slider bar 121. As illustrated in FIG. 1A, an indicator on the slider bar 121 is set to the left most position for a zero ("0") shading setting value as indicated by amount indicator 119. The indicator on the slider bar 121 may be adjusted to the right to change the shading setting of the graphical user interface. When the indicator on the slider bar 121 is adjusted all the way to the right of the slider bar 121 then the shading setting in the amount indicator 119 will display "100".

Figure 2:
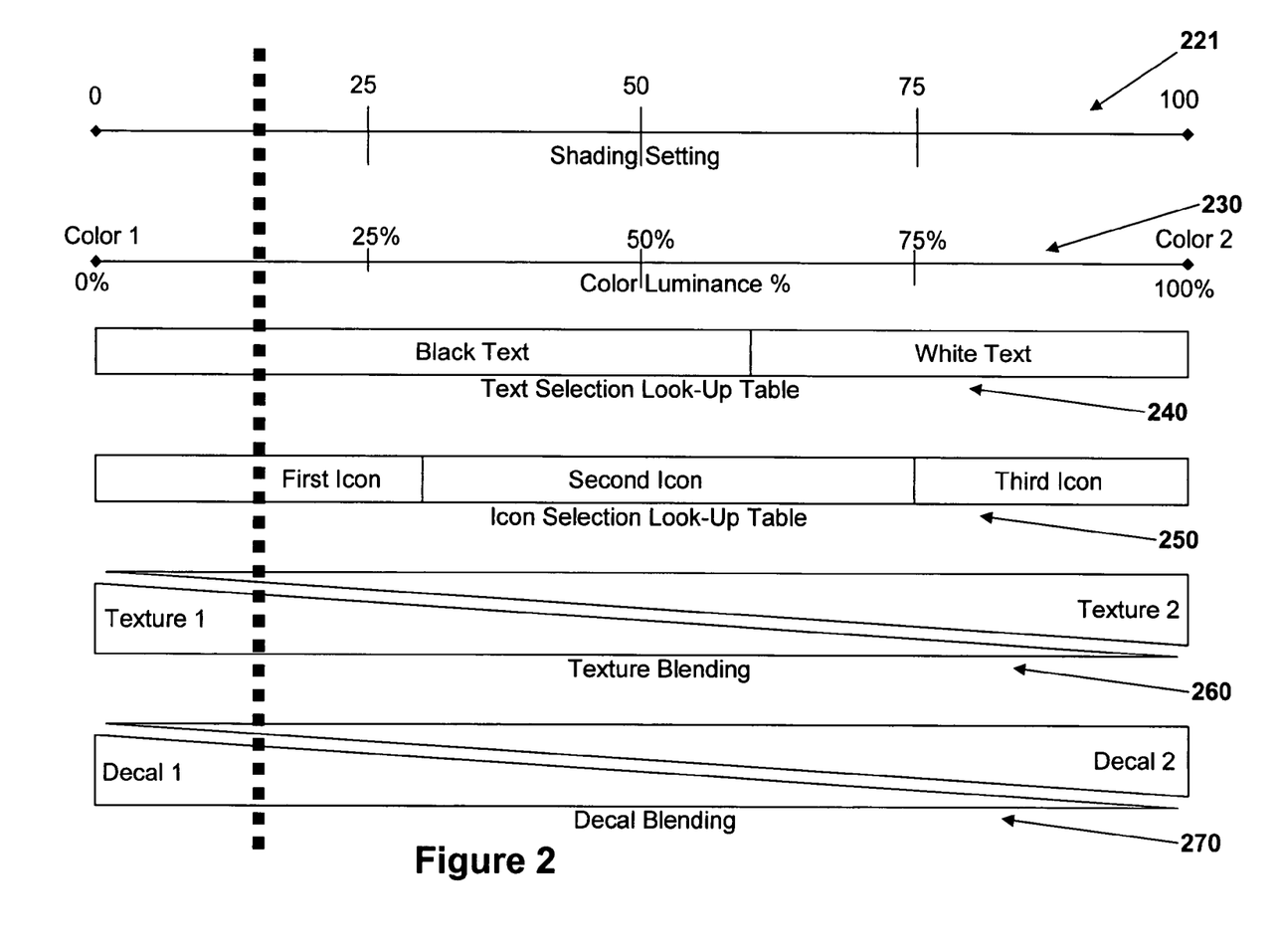
FIG. 2 illustrates a conceptual diagram that describes how the graphical user interface shading system handles the shading of various different user interface elements.

Below slider bar 121 and amount indicator 119 is a save button 128. Save button 128 allows the user to save the current shading setting. In the embodiment of FIG. 2, the user may save the current shading setting into any of the four custom shading setting buttons that are below save button 128. The saved shading setting may be recalled by pressing the associated custom shading setting button.

The right side of FIG. 1A illustrates an application window 139 containing the graphical user interface for a video editing program. The shading of the video editing program graphical user interface is controlled using the slider bar 121 in the user interface adjustment window 111. The application window 139 contains many different user interface elements that are displayed to the user. Each of these different user interface elements must be adjusted by the shading system to present a consistent graphical user interface shading experience to the user. Each user interface element will be discussed in detail.

Flat Single Color Areas of the Graphical User Interface

Large areas of the graphical user interface for an application are filled with a single flat background color. For example, area 131 of FIG. 1A is filled with a solid background color that acts as the background for a list of file names. The graphical user interface shading system of the present invention handles flat areas by having the application programmer supply two different pixel color values that represent the two color extremes (color 1 and color 2) for the two extremes of the shading system (setting 0 and setting 100, respectively). The graphical user interface shading system then selects a color for the area by determining a linear interpolation between the two colors.

FIG. 2 illustrates a conceptual diagram that describes how the graphical user interface shading system of the present invention handles different user interface elements. FIG. 2 illustrates a shading slider 221 that is a representation of the shading slider 121 of FIG. 1A. Below the shading slider 221 of FIG. 2 is a color luminance scale 230 aligned with the shading slider 221 that has color 1 on the left and color 2 on the right. In one embodiment, color 1 and color 2 have the same hue (H) and saturation (S) but only differ by their luminance value (V). In such an embodiment, the system reads the shading setting and determines a linear interpolation between the two color values (color 1 and color 2). For example, FIG. 2 illustrates a dotted line that represents a shading setting of 15. With such a shading setting, the graphical user interface shading system of the present invention determines a color with a luminance value that is 15% between the luminance of color 1 and the luminance of color 2.

Text Sections of the Graphical User Interface

Even graphical user interfaces contain significant amounts of alphanumeric text material. Thus, the graphical user interface shading system of the present invention must handle shading adjustments of such alphanumeric text. To handle text, the graphical user interface shading system uses the shading setting to select a font color to use.

FIG. 2 illustrates a conceptual diagram of a text color selection look-up table 240. The text color selection look-up table specifies what color of text should be used for a particular shading setting. In the embodiment of FIG. 2, black text is used up until the "60" shading setting. For higher shading settings, white colored text is used. Ideally, the text color look-up table should be created in concert with the various background area colors such that adequate contrast between the text and the background color is maintained for all shading settings.

The embodiment illustrated in FIG. 2 uses only black text for a certain range of the shading setting and then white text for the remainder of shading settings. However, there is no limitation to just having two font colors.

Graphical User Interface Icons

Most graphical user interfaces also contain simple icons that users may view and interact with in addition to text. For example, FIG. 1A illustrates application window 139 that contains clock icon 151.

The graphical user interface shading system of the present invention handles the shading adjustments of simple icons in a manner similar to the system for handling text. Specifically, the graphical user interface designer creates a set of different icons for different shading ranges. The graphical user interface designer then specifies a shading range that defines when each icon will be used.

FIG. 2 illustrates an icon selection look-up table 250 for selecting a particular icon representation that will be used to drawing the icon. In the embodiment of FIG. 2, a first icon is used from shading range 0 to 30, a second icon is used from 30 to 75, and a third icon is used from 75 to 100. However, the shading setting continuum may be divided into any number of different ranges with each range having an associated icon representation that should be used within that range.

Textured Areas of the Graphical User Interface

Instead of simply using a single color, some areas of user interfaces use 'textures' to provide a more life-like appearance. A texture is a two-dimensional bit-mapped image that may be used to cover any surface. For example, area 161 in FIG. 1A is rendered with a texture.

The graphical user interface shading system of the present invention handles decals in the same manner that textures are handled. Specifically, the graphical user interface designer creates a first decal (decal 1) for the 0 shading setting and a second decal (decal 2) for the 100 shading setting. The graphical user interface shading system then generates a weighted blend of the two decals depending on the shading setting. The weighted blend varies from 100% decal 1 at shading setting 0 to 100% decal 2 at shading setting 100. FIG. 2 conceptually illustrates the decal blending system with decal blend diagram 270.

User Interface Decals

Certain user interface devices are more complex than simple icons. To render more complex user interface devices, a graphical user interface may use 'decals'. A decal is a small two-dimensional object that may be rendered on the screen. For example, user interface device 171 in FIG. 1A is rendered with a decal.

The graphical user interface shading system of the present invention handles decals in the same manner that textures are handled. Specifically, the graphical user interface designer creates a first decal (decal 1) for the 0 shading setting and a second decal (decal 2) for the 100 shading setting. The graphical user interface shading system then generates a weighted blend of the two decals depending on the shading setting. The weighted blend varies from 100% decal 1 at shading setting 0 to 100% decal 2 at shading setting 100. FIG. 2 conceptually illustrates the texture blending system with texture blend diagram 260.

Graphical Shading System Implementation

Figure 3:
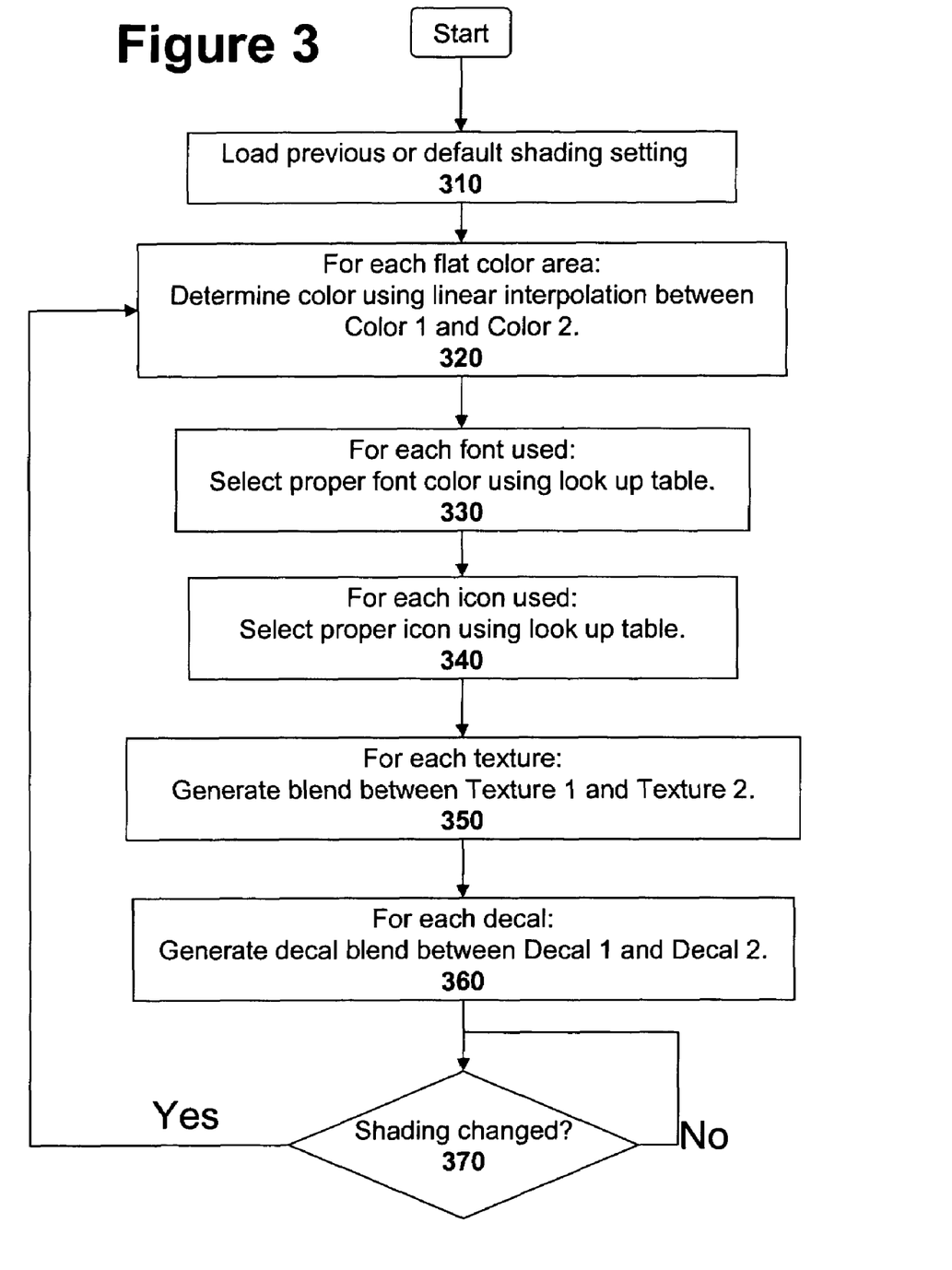
FIG. 3 illustrates a flow diagram that describes how one embodiment of the graphical user interface shading system may operate.

FIG. 3 illustrates a flow diagram that describes how one embodiment of the graphical user interface shading system may operate. Referring to FIG. 3, when the application first begins execution, the shading system loads the previous shading setting or a default shading setting (depending on the implementation) at step 310. In the embodiment described with reference to FIGS. 1A to 2, the shading setting may be a value from 0 to 100.

Next, at step 320, the shading system determines the colors that will be used in areas filled in with a flat single color. As set forth in step 320, the shading system selects a linear interpolation between the two colors defined for each area (color 1 and color 2). In a preferred embodiment, the interpolation is only along a luminance difference between color 1 and color 2. The interpolated color for each area will be used to fill in the background for that area.

At step 330, the shading system addresses text elements. For each font used, the shading system uses the shading setting as an index into a look-up table associated with that font to determine what color will be used to render the font on the screen. Note that different fonts may use different look up tables or all the fonts may use the same look-up table.

Next, at step 340, the shading system handles icons. For each icon that is used in the graphical user interface, the shading system uses the shading setting as an index into a look-up table associated with the icon to determine which bitmap will be used to render the icon on the screen.

Then, at step 350, the shading system creates a set of textures to use for the textured areas of the graphical user interface. For each different texture, the shading system creates a weighted texture blend using the two textures provided by the graphical user interface designer. The blended texture will be used in the associated textured areas of the graphical user interface.

Finally, at step 360, the shading system creates a set of decals to represent user interface objects. For each decal in the graphical user interface, the shading system creates a weighted decal blend using the two decals (decal 1 and decal 2) provided by the graphical user interface designer for the two shading extremes. The graphical user interface is then rendered using the blended decal.

After step 360, the application program runs normally using the background colors, font colors, icons, blended textures, and blended decals created for that particular shading setting. However, if the shading system determines (at step 370) that the shading setting has changed, then the shading system returns to step 320 to create a new set of background colors, font colors, icons, blended textures, and blended decals created for the new shading setting.

Graphical User Interface Shading System Example

To illustrate how the graphical user interface shading system operates in an actual application, FIGS. 1A to 1E illustrate how the appearance of an example graphical user interface change as the shading setting value is moved from 0 to 100 in four increments of 25.

Initially, in FIG. 1A, the graphical user interface of the application window 139 features black text 141 on light backgrounds 131. The icons, such as icon 151, are also black like the text. The textured areas, such as texture 161, are light colored like the single colored background area 131. Finally, the decals such as decal 171 are also relatively light.

Figure 1B:
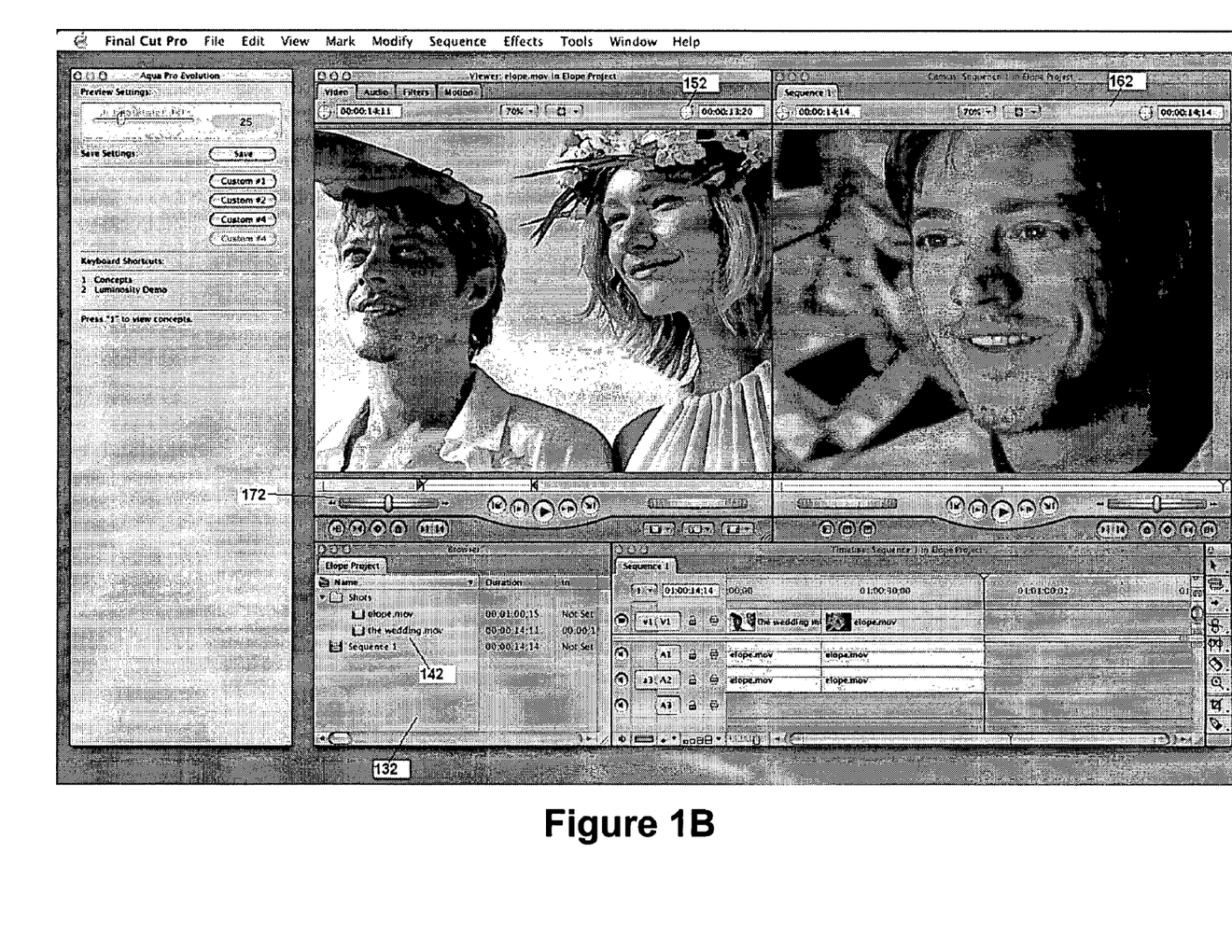
FIG. 1B illustrates a second view of a user interface adjustment window for adjusting the shading of a graphical user interface and a graphical user interface that is having its shading adjusted.

When a user moves the indicator on the shading slider 121 to the right to the '25' shading setting, the graphical user interface of the application window will appear as shown in FIG. 1B. Note that in FIG. 1B, the text 142 and the icons 152 are still black. However, the single colored background 132, texture 162, and decal 172 have become darker.

Figure 1C:
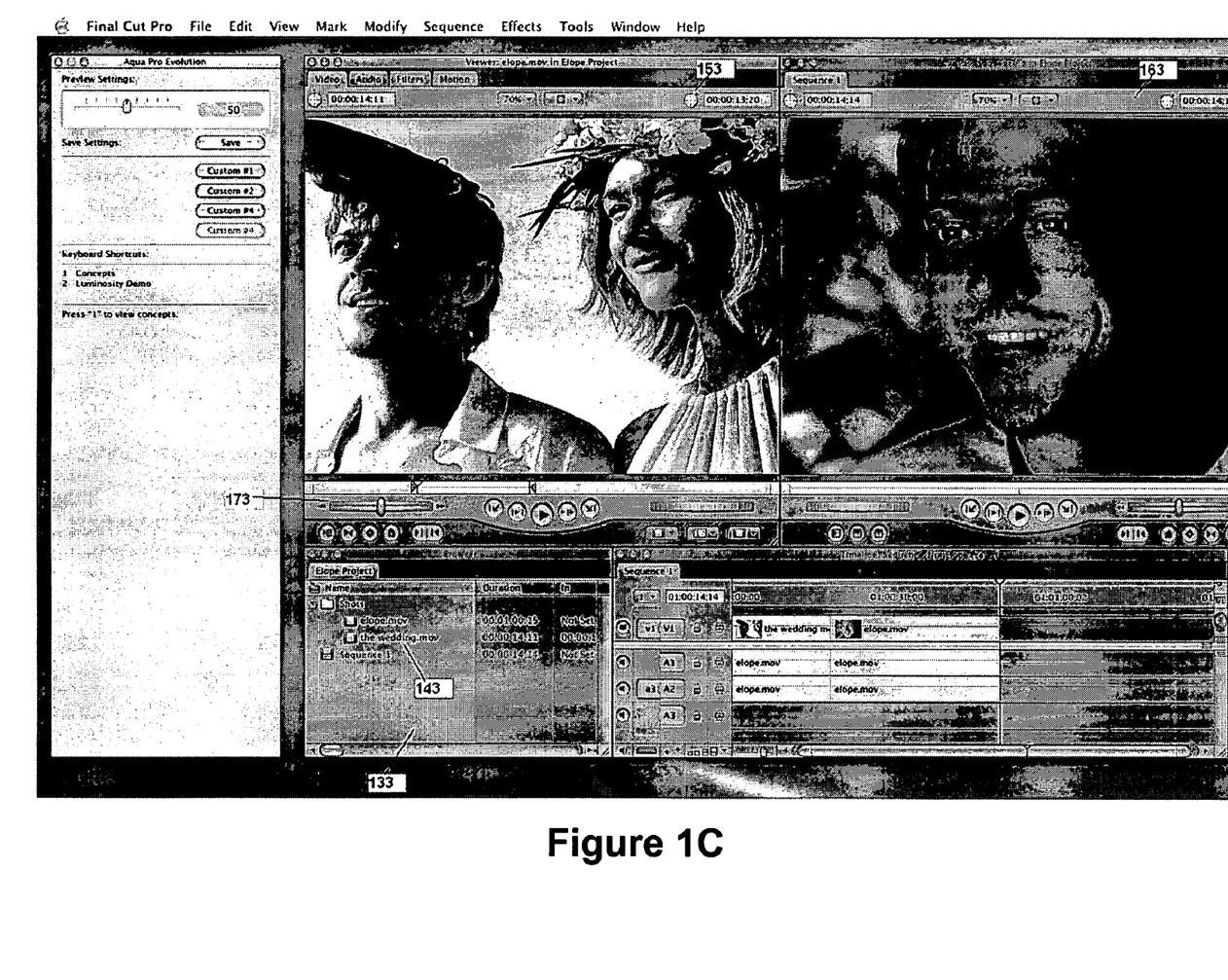
FIG. 1C illustrates a third view of a user interface adjustment window for adjusting the shading of a graphical user interface and a graphical user interface that is having its shading adjusted.

When a user moves the indicator on the shading slider of FIG. 1B even further to the right, to the '50' shading setting, the graphical user interface of the application window will appear as shown in FIG. 1C. Again, note that in FIG. 1C, the text 143 and the icons 153 are still black. However, the single colored background 133, texture 163, and decal 173 have become even darker due to the blending.

Figure 1D:
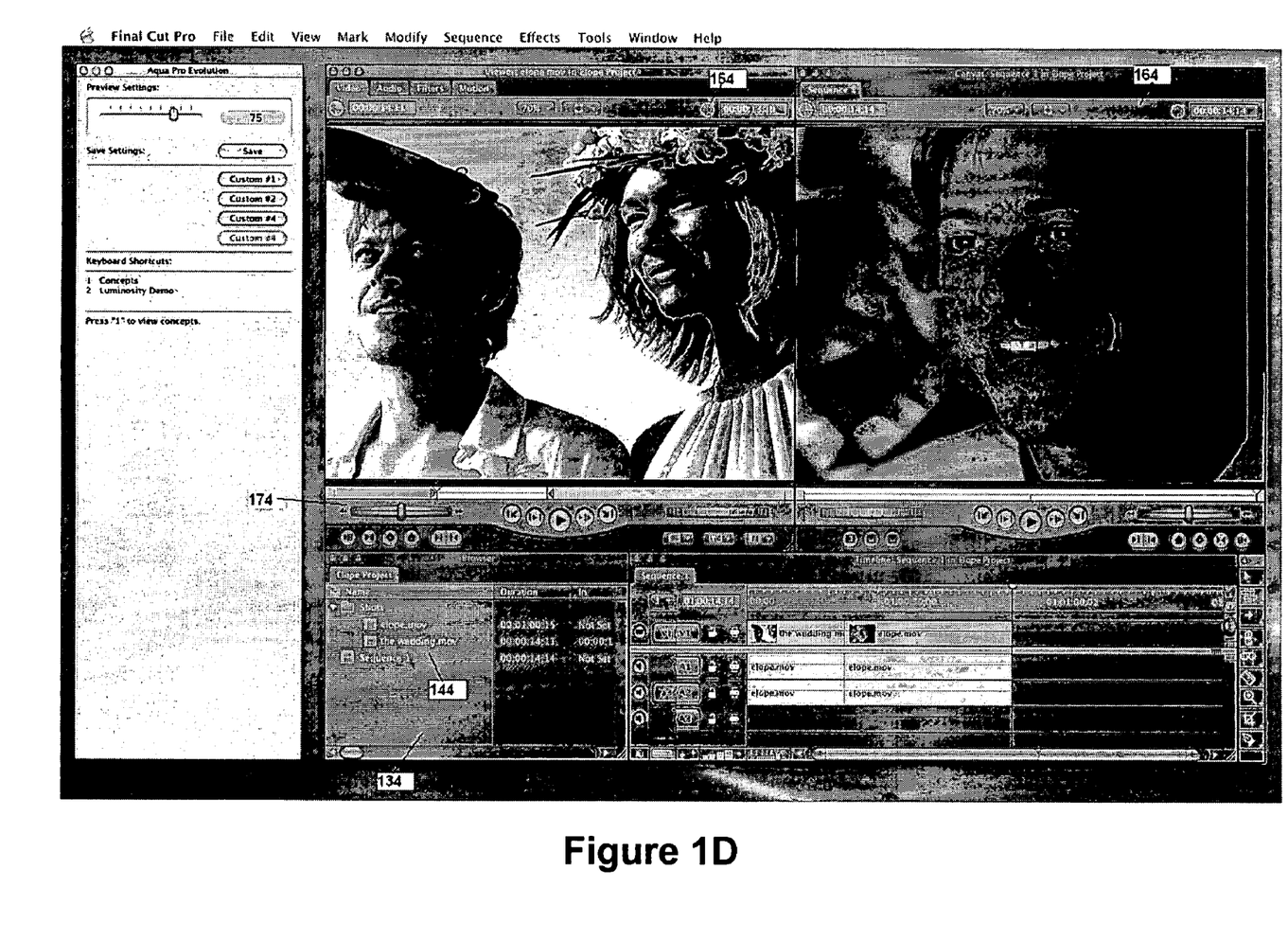
FIG. 1D illustrates a fourth view of a user interface adjustment window for adjusting the shading of a graphical user interface and a graphical user interface that is having its shading adjusted.

When a user moves the indicator on the shading slider of FIG. 1C even further to the right, to the '75' shading setting, the graphical user interface of the application window will appear as shown in FIG. 1D. In FIG. 1D, the single colored background 134, texture 164, and decal 174 have become yet even darker due to the blending. However, in FIG. 1D, the text 144 and the icons 154 are now rendered in white to provide greater contrast with the darkened background.

Figure 1E:
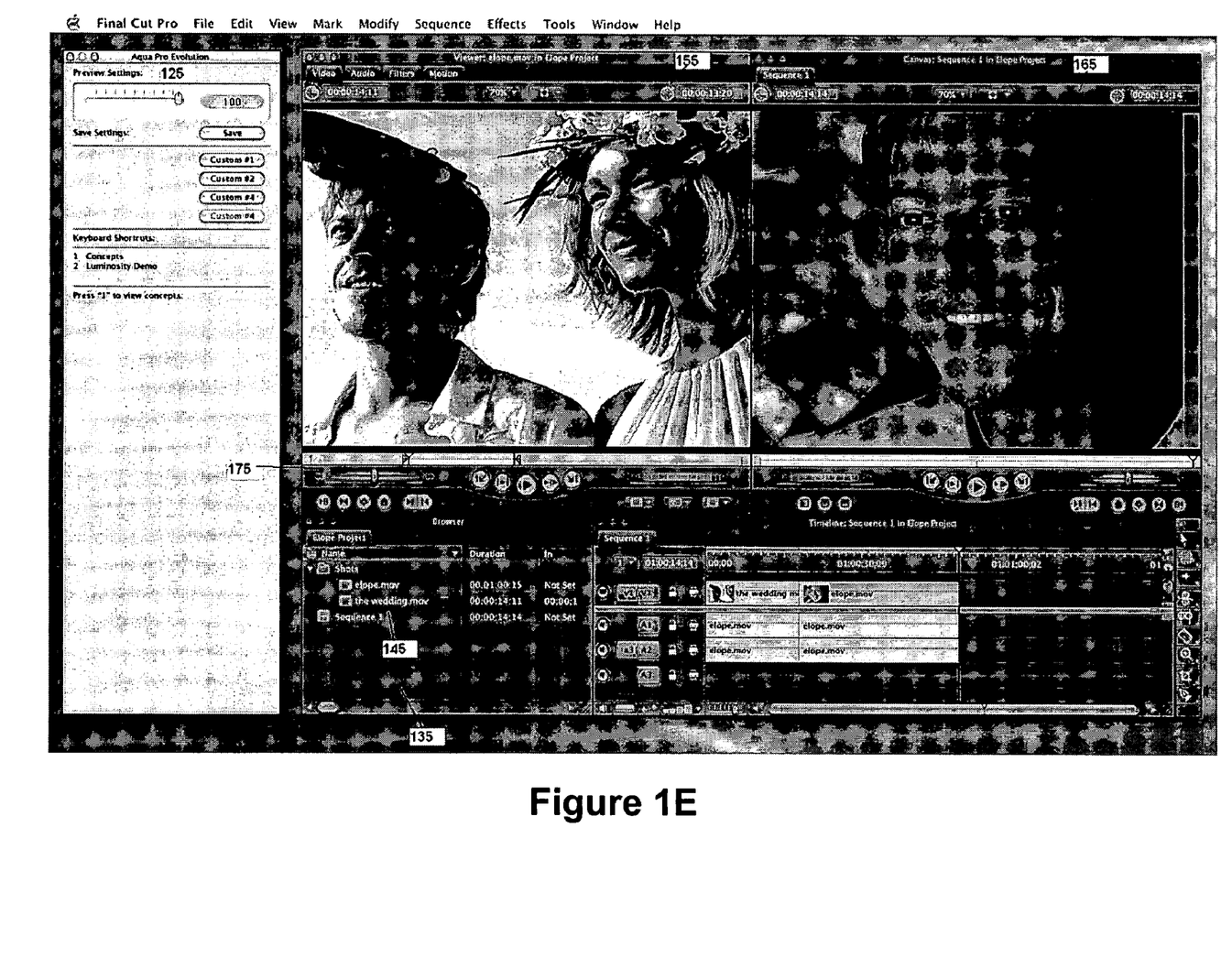
FIG. 1E illustrates a fifth view of a user interface adjustment window for adjusting the shading of a graphical user interface and a graphical user interface that is having its shading adjusted.

Finally, when a user moves the indicator on the shading slider of FIG. 1D completely to the right-hand side to the '100' shading setting, the graphical user interface of the application window will appear as shown in FIG. 1E. As was illustrated in FIG. 1D, the text 145 and the icons 155 are rendered in white to contrast with the very dark background areas. Specifically, the single colored background 135, texture 165, and decal 175 have become very dark since the dark color 2, the dark texture 2, and dark decal 2 are used, respectively.

The foregoing has described a graphical user interface shading system. It is contemplated that changes and modifications may be made by one of ordinary skill in the art, to the materials and arrangements of elements of the present invention without departing from the scope of the invention.

We claim:

1. A method of rendering a graphical user interface, said method comprising:
   accepting a shading setting value through a user interface;
   determining a first user interface element appearance based upon a first operation with said shading setting value, said first operation not requiring any input through the user interface other than said shading setting value;
   determining a second user interface element appearance based upon a second operation with said shading setting value, said second operation not requiring any input through the user interface other than said shading setting value, wherein said second operation is different from said first operation;
   determining a third user interface element appearance based upon a third operation with said shading setting value, said third operation different from said first operation and said second operation; and
   displaying at least one of said user interface elements based on the corresponding appearance of said at least one user interface elements.

2. The method of rendering a graphical user interface as claimed in claim 1 wherein said first operation comprises a linear interpolation and said second operation comprises a table look-up.

3. The method of rendering a graphical user interface as claimed in claim 2 wherein said table look-up comprises determining a font color.

4. The method of rendering a graphical user interface as claimed in claim 2 wherein said table look-up comprises selecting an icon bitmap.

5. The method of rendering a graphical user interface as claimed in claim 1 wherein said first operation comprises a linear interpolation, said second operation comprises a table look-up, and said third operation comprises a blend operation.

6. The method of rendering a graphical user interface as claimed in claim 1 wherein said shading setting value is set using a slider user interface element.

7. The method of rendering a graphical user interface as claimed in claim 1, wherein the first operation comprises a computation operation with said shading setting value.

8. The method of rendering a graphical user interface as claimed in claim 7, wherein the second operation comprises a computation operation with said shading setting value.

9. A method of rendering a graphical user interface, said method comprising:
   accepting a shading setting value through a user interface;
   determining a first user interface element appearance based upon a first operation with said shading setting value, said first operation not requiring any input through the user interface other than said shading setting value;
   determining a second user interface element appearance based upon a second operation with said shading setting value, said second operation not requiring any input through the user interface other than said shading setting value, wherein said second operation is different from said first operation; and
   displaying at least one of said user interface elements based on the corresponding appearance of said at least one user interface elements;
   wherein said first operation comprises a linear interpolation and said second operation comprises a blend operation.

10. The method of rendering a graphical user interface as claimed in claim 9 wherein said blend operation comprises blending a first texture and a second texture.

11. The method of rendering a graphical user interface as claimed in claim 9 wherein said blend operation comprises blending a first decal and a second decal.

12. The method of rendering a graphical user interface as claimed in claim 9 wherein said linear interpolation comprises interpolating between a first color and a second color.

13. The method of rendering a graphical user interface as claimed in claim 2 wherein said linear interpolation is only performed along a luminance value.

14. A method of rendering a graphical user interface, said method comprising:
   accepting a shading setting value through a user interface;
   determining a first user interface element appearance based upon a first operation with said shading setting value, said first operation not requiring any input through the user interface other than said shading setting value;
   determining a second user interface element appearance based upon a second operation with said shading setting value, said second operation not requiring any input through the user interface other than said shading setting value, wherein said second operation is different from said first operation; and
   displaying at least one of said user interface elements based on the corresponding appearance of said at least one user interface elements;
   wherein said first operation comprises a blend operation and said second operation comprises a table look-up.

* * * * *

UNITED STATES PATENT AND TRADEMARK OFFICE
CERTIFICATE OF CORRECTION

| | |
|---|---|
| PATENT NO. | : 7,184,056 B2 |
| APPLICATION NO. | : 10/301500 |
| DATED | : February 27, 2007 |
| INVENTOR(S) | : Sarah Brody et al. |

It is certified that error appears in the above-identified patent and that said Letters Patent is hereby corrected as shown below:

Column 7,

Claim 1, lines 45-47 read, "displaying at least one of said user interface elements based on the corresponding appearance of said at least one user interface elements."

should read -- displaying at least one of said user interface elements based on the corresponding appearance of said at least one of the user interface elements. --

Column 8,

Claim 9, lines 24-26 read, "displaying at least one of said user interface elements based on the corresponding appearance of said at least one user interface elements;"

should read -- displaying at least one of said user interface elements based on the corresponding appearance of said at least one of the user interface elements. --

Claim 13, lines 39-41 read, "The method of rendering a graphical user interface as claimed in claim 2 wherein said linear interpolation is only performed along a luminance value."

should read -- The method of rendering a graphical user interface as claimed in claim 12 wherein said linear interpolation is only performed along a luminance value. --

UNITED STATES PATENT AND TRADEMARK OFFICE
CERTIFICATE OF CORRECTION

PATENT NO. : 7,184,056 B2
APPLICATION NO. : 10/301500
DATED : February 27, 2007
INVENTOR(S) : Sarah Brody et al.

It is certified that error appears in the above-identified patent and that said Letters Patent is hereby corrected as shown below:

Column 8,

Claim 14, lines 56-58 read, "displaying at least one of said user interface elements based on the corresponding appearance of said at least one user interface elements;"

should read -- displaying at least one of said user interface elements based on the corresponding appearance of said at least one of the user interface elements. --

Signed and Sealed this

Twenty-third Day of October, 2007

JON W. DUDAS
*Director of the United States Patent and Trademark Office*